Jan. 16, 1945.　　　M. E. HANSON　　　2,367,276
AIR CONDITIONING SYSTEMS FOR PASSENGER VEHICLES
Filed July 16, 1943　　　2 Sheets-Sheet 2
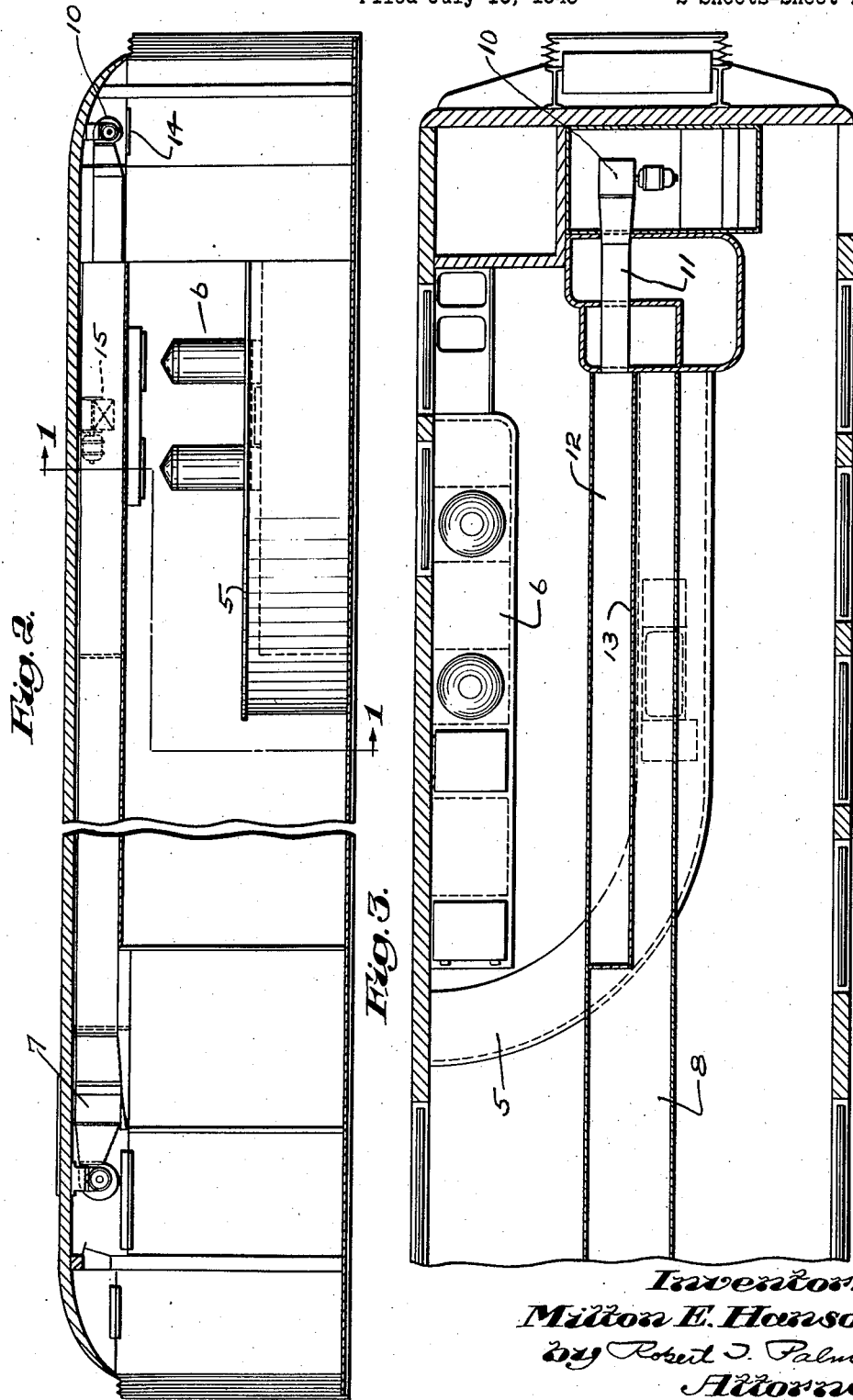
Inventor:
Milton E. Hanson,
by Robert J. Palmer
Attorney Patented Jan. 16, 1945

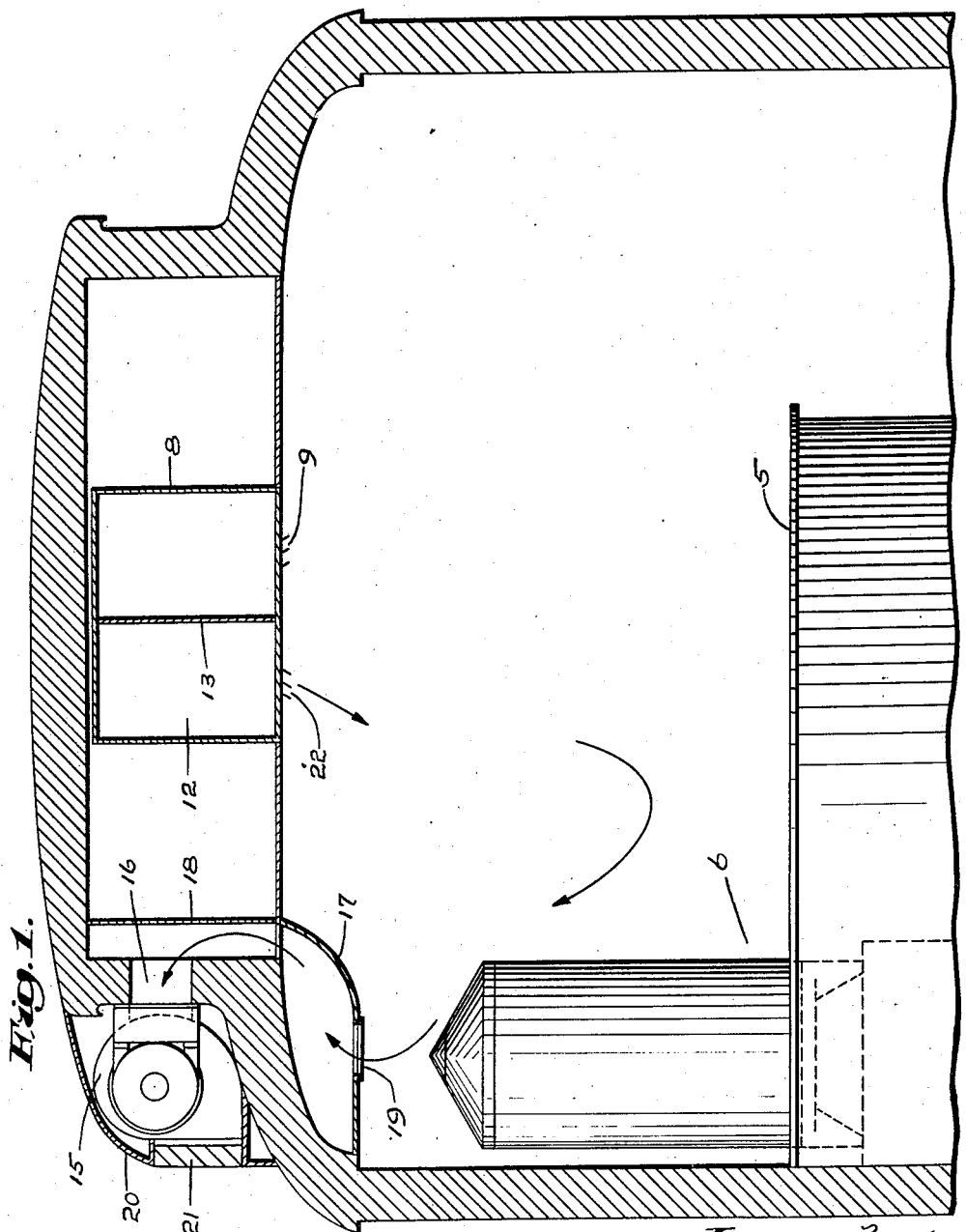

2,367,276

UNITED STATES PATENT OFFICE 2,367,276

AIR CONDITIONING SYSTEM FOR PASSENGER VEHICLES

Milton E. Hanson, Haddonfield, N. J., assignor to B. F. Sturtevant Company, Boston, Mass.

Application July 16, 1943, Serial No. 494,978

6 Claims. (Cl. 98—10)

This invention relates to air conditioning systems and relates more particularly to air conditioning systems for the so-called railway cafeteria cars.

In the so-called railway cafeteria cars, there are lunch counters as well as tables at which the passengers dine. The steam tables, percolators, etc., are not partitioned off from the passenger space with the result that the heat therefrom results in a vastly increased load on the refrigerating system if the car is adequately cooled.

The invention provides an air seal which curtains the kitchen space behind the lunch counter in a cafeteria car and prevents the heat from penetrating the passenger space. In a preferred embodiment of the invention, this is accomplished by blowing a high velocity stream of outdoor air from the longitudinal center of the car over the lunch counter, and discharging this air and the heated air it deflects, from the roof of the car behind the counter space.

An object of the invention is to decrease the refrigeration cost of an air conditioned passenger vehicle having a lunch counter therein.

The invention will now be described with reference to the drawings, of which:

Fig. 1 is a transverse section of a railway cafeteria car embodying this invention and is an enlarged view taken along the lines 1—1 of Fig. 2;

Fig. 2 is a side elevation in section of the car of Fig. 1, and

Fig. 3 is an enlarged plan view of the end of the car containing the lunch counter.

The drawings do not illustrate the tables and seats and other details not essential for an understanding of the invention.

The lunch counter 5 is located in one end of the car and has the kitchen, cooking and heating apparatus indicated generally by 6 located behind it.

The air conditioning apparatus indicated generally by 7 is located at the other end of the car, above the ceiling. This apparatus preferably is similar to that disclosed in my U. S. Patent No. 2,189,731 which issued February 6, 1940. This apparatus is connected to the duct 8 which extends along the longitudinal center of the car and which has the deflectors 9 in its outlets for guiding the conditioned air away from the direction of the counter 5.

The blower 10 is located in the end of the car opposite the end in which the air conditioner 7 is located, and is connected by the duct 11 into the passage 12, in the air distributing duct 8. The partition 13 separates the passage 12 from the conditioned air. The inlet of the blower 10 receives outdoor air through the air inlet 14.

The exhaust blower 15 is located on the roof of the car at one side thereof and its inlet connects with the air inlet 16 in the side of the roof. The walls 17 and 18 provide with the roof of the car, an exhaust air passage through which heated air from over the kitchen apparatus can pass through the exhaust outlet 19.

The blower 15 is protected from the weather by the wall 20 which covers it and which has the air outlet louvres 21.

The air conditioning apparatus 7 is operated to supply conditioned air through the duct 8. In the vicinity of the lunch counter 5, the deflectors 9 deflect the conditioned air away from the lunch counter. Beyond the lunch counter area, the duct 8 may be provided with the usual discharge outlets without the deflectors 9.

The blowers 10 and 15 are operated continuously during the operation of the air conditioner 7. The blower 10 draws in large volumes of outdoor air and this air passes from the passage 12 in the duct 8 and is guided by the deflectors 22 towards the rear of the counter 5.

The blower 15 draws the heated air from behind the counter 5 and discharges it into the atmosphere.

The heated air from the kitchen apparatus tends to rise to the roof of the car and to mingle with the conditioned air in the car. It is prevented from doing this by the high velocity curtain of outdoor air guided by the deflectors 22 and which deflects the heated air as illustrated by the arrows of Fig. 1 and causes it to be exhausted by the blower 15. Thus no heated air from the kitchen apparatus is permitted to enter the passenger space.

While one embodiment of the invention has been described for the purpose of illustration, it should be understood that the invention is not limited to the exact apparatus and arrangement of apparatus described as modifications thereof may be suggested by those skilled in the art without departure from the essence of the invention.

What is claimed is:

1. In a passenger vehicle having a kitchen at one side thereof and having an air conditioner and an overhead duct through which the conditioned air is supplied into the passenger space, means forming an exhaust air passage over said kitchen at said one side of the vehicle, and means for blowing outdoor air from alongside said duct towards said passage for deflecting heated air from said kitchen away from said duct and towards said passage.

2. In a passenger vehicle having a kitchen space and having an air conditioner and an overhead duct through which the conditioned air is supplied into the passenger space, means forming an exhaust air passage over said kitchen space at one side of said vehicle, means for blowing outdoor air from alongside said duct towards said passage, and means for guiding the conditioned air discharged from said duct, in a direction away from said kitchen space and said passage.

3. In a passenger vehicle having a kitchen space and having an air conditioner, an overhead conditioned air distributing duct connected to said conditioner and extending longitudinally over the passenger space, an outdoor air duct extending alongside said duct over the kitchen space, means forming an exhaust air passage extending from over said kitchen space into the outdoors, and a blower connected to said outdoor air duct for blowing outdoor air downwardly into the kitchen space for deflecting the heated air therefrom, into said passage.

4. In a passenger vehicle having a kitchen space and having an air conditioner, an overhead conditioned air distributing duct connected to said conditioner and extending longitudinally over the passenger space, an outdoor air duct extending alongside said duct over the kitchen space, means forming an exhaust air passage extending from over said kitchen space into the outdoors, a blower connected to said outdoor air duct for blowing outdoor air downwardly into the kitchen space for deflecting the heated air therefrom, into said passage, and an exhaust blower connected to the outlet end of said passage for exhausting the heated air and the air supplied by said first mentioned blower, into the atmosphere.

5. In a passenger vehicle having a kitchen space and having an air conditioner, an overhead conditioned air distributing duct connected to said conditioner and extending longitudinally over the passenger space, an outdoor air duct extending alongside said duct over the kitchen space, means forming an exhaust air passage extending from over said kitchen space into the outdoors, a blower connected to said outdoor air duct for blowing outdoor air downwardly into the kitchen space for deflecting the heated air therefrom, into said passage, means for deflecting the air from said conditioned air duct in a direction away from said kitchen space, and means for deflecting the air from said outdoor air duct, towards said exhaust passage.

6. In a passenger vehicle having a kitchen space and having an air conditioner, an overhead conditioned air distributing duct connected to said conditioner and extending longitudinally over the passenger space, an outdoor air duct extending alongside said duct over the kitchen space, means forming an exhaust air passage extending from over said kitchen space into the outdoors, a blower connected to said outdoor air duct for blowing outdoor air downwardly into the kitchen space for deflecting the heated air therefrom, into said passage, an exhaust blower connected to the outlet end of said passage for exhausting the heated air and the air supplied by said first mentioned blower, into the atmosphere, means for deflecting the air from said conditioned air duct in a direction away from said kitchen space, and means for deflecting the air from said outdoor air duct, towards said exhaust passage.

MILTON E. HANSON.